United States Patent
Yuan et al.

(10) Patent No.: US 11,977,990 B2
(45) Date of Patent: May 7, 2024

(54) DECISION TREE INTERFACE FOR NEURAL NETWORKS

(71) Applicant: International Business Machines Corporation, Armonk, NY (US)

(72) Inventors: Zhong Fang Yuan, Xian (CN); De Shuo Kong, Beijing (CN); Yun He Gao, Xian (CN); Tong Liu, Xian (CN); Peng Yun Sun, Beijing (CN); Ya Dong Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 16/860,218

(22) Filed: Apr. 28, 2020

(65) Prior Publication Data

US 2021/0334632 A1 Oct. 28, 2021

(51) Int. Cl.
| | |
|---|---|
| *G06F 21/00* | (2013.01) |
| *G06F 16/901* | (2019.01) |
| *G06F 18/243* | (2023.01) |
| *G06N 3/044* | (2023.01) |
| *G06N 3/063* | (2023.01) |
| *G06N 3/084* | (2023.01) |
| *G06N 5/045* | (2023.01) |

(52) U.S. Cl.
CPC ......... *G06N 5/045* (2013.01); *G06F 16/9024* (2019.01); *G06F 18/24323* (2023.01); *G06N 3/044* (2023.01); *G06N 3/063* (2013.01); *G06N 3/084* (2013.01)

(58) Field of Classification Search
CPC .......................... G06F 16/9024; G06K 9/6282
See application file for complete search history.

(56) References Cited

U.S. PATENT DOCUMENTS

| | | | |
|---|---|---|---|
| 5,396,580 A | 3/1995 | Fu | |
| 2016/0048566 A1* | 2/2016 | Meng | G06N 20/00 706/12 |
| 2018/0158552 A1 | 6/2018 | Liu et al. | |
| 2019/0051290 A1* | 2/2019 | Li | G10L 15/16 |
| 2019/0142291 A1 | 5/2019 | Obeid et al. | |

(Continued)

FOREIGN PATENT DOCUMENTS

| | | |
|---|---|---|
| RU | 2689818 C1 | 5/2019 |
| WO | 2001061647 A2 | 8/2001 |
| WO | 2019180310 A1 | 9/2019 |

OTHER PUBLICATIONS

"Human-Guided Column Networks: Augmenting Deep Learning With Advice", Under review as a conference paper at ICLR 2019, ICLR 2019 Conference, Sep. 2018, 11 pages. https://openreview.net/forum?id=HJeOMhA5K7.

(Continued)

*Primary Examiner* — Brandon Hoffman
*Assistant Examiner* — Thong P Truong
(74) *Attorney, Agent, or Firm* — Jeffrey M. Ingalls (57) ABSTRACT

A first set of features associated with a neural network are parameterized. A decision tree is generated from the first set of features. One or more adjustments for the neural network are received at the decision tree. A second set of features associated with the adjustments at the decision tree are parameterized. The parameterized first and second set of features are combined into a plurality of parameters. From the plurality, an adjusted neural network is generated.

20 Claims, 4 Drawing Sheets

(56) References Cited

U.S. PATENT DOCUMENTS

2019/0197141 A1\* 6/2019 Gomez .............. G06F 3/0482
2020/0184272 A1\* 6/2020 Zhang ................ G06N 20/00

OTHER PUBLICATIONS

Tan et al., "Improving the Interpretability of Deep Neural Networks With Stimulated Learning", © 2015 IEEE, ASRU 2015, Dec. 2015, 7 pages. https://ieeexplore.ieee.org/abstract/document/7404853.

Hu et al., "Deep Neural Networks with Massive Learned Knowledge", Proceedings of the 2016 Conference on Empirical Methods in Natural Language Processing, Austin, Texas, Nov. 1-5, 2016, Copyright 2016 Association for Computational Linguistics, 10 pages. https://www.aclweb.org/anthology/D16-1173/.

\* cited by examiner

DECISION TREE INTERFACE FOR NEURAL NETWORKS

BACKGROUND

The present disclosure relates generally to the field of neural network interpretability, and more particularly to using decision trees as an interface for interpreting and modifying neural networks.

Neural networks and machine learning are becoming more and more prevalent in several aspects of computer science. Machine learning models may be used for a wide variety of applications, such as "reading" handwritten documents, generating and calculating algorithms, generating dynamic navigation routes that take into account historical traffic density, etc.

SUMMARY

Embodiments of the present disclosure include a method, computer program product, and system for generating and using an interactive decision tree from a neural network.

A first set of features associated with a neural network are parameterized. A decision tree is generated from the first set of features. One or more adjustments for the neural network are received at the decision tree. A second set of features associated with the adjustments at the decision tree are parameterized. The parameterized first and second set of features are combined into a plurality of parameters. From the plurality, an adjusted neural network is generated.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of neural network interpretability, and more particularly to using decision trees as an interface for interpreting and modifying neural networks. While the present disclosure is not necessarily limited to such applications, various aspects of the disclosure may be appreciated through a discussion of various examples using this context.

Neural networks are being used with increasing frequency for their advantages in accuracy and data feature extraction. However, traditional neural networks operate as a "black box," where the inner workings and interaction among the nodes of the neural network are unclear. A user feeds data into the input layer and receives an output from the output layer; in most cases, it is impossible to interpret the data modifications within the "black box." As such, neural networks are limited in their ease-of-interpretability. They can be difficult to train properly, as training data is fed through all the nodes of the network.

Other data structures, such as decision trees and directed acyclic graphs (DAGs), can be used to increase the interpretability of neural networks for user(s). Users can access each node of the tree/graph to see the contents, and there is a clear path for the data flow from the input through the output. However, traditional decision trees and DAGs typically must trade accuracy and automatic feature extraction to obtain the enhanced interpretability.

Embodiments of the present disclosure contemplate techniques and methods for generating and using a decision tree and/or other data structures (e.g., a DAG) based on the features (e.g., the number of layers, the number of neurons in each layer, neuron type, weights for the edges, biases for the edges, data embedded within the neurons, functions performed by the neurons, timing of neuron operations, etc.) of the neural network. In some embodiments, the decision tree may be presented as a more interpretable interface for a user to interact with the neural network and/or make adjustments or modifications to the neural network. In some embodiments, the interface may be directly linked to the neural network in such a way to facilitate concurrent adjustment. In this way, user modifications/adjustments to the decision tree or other data structure may provide "on-the-fly" adjustments to the neural network itself. Advantages of the several embodiments may include, but are not limited to, maintaining the high accuracy and feature extraction aspects of the neural network while incorporating a more interpretable interface, and the ability to include manual adjustments targeted to specific sub-units of the neural network.

Figure 1:
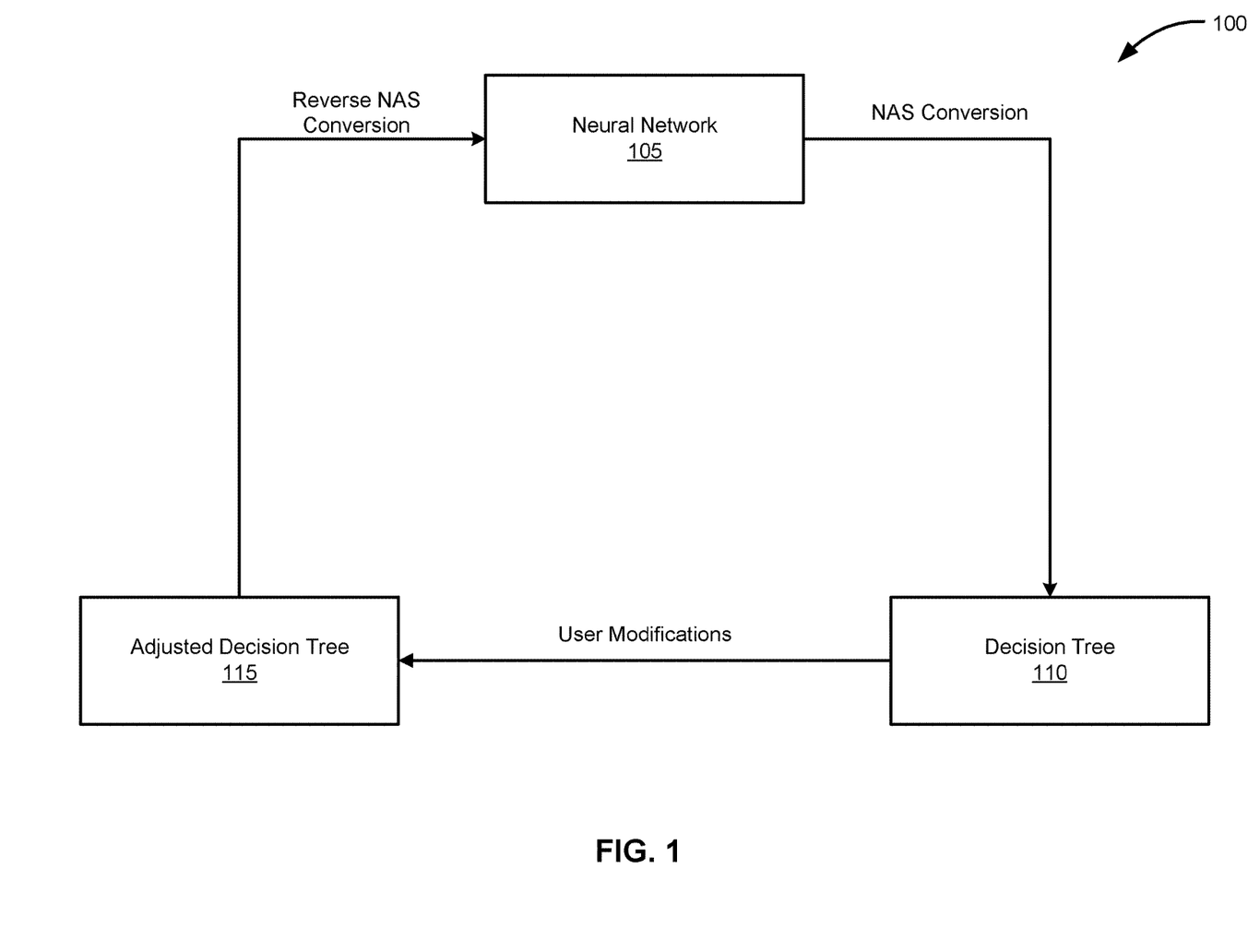
FIG. 1 illustrates a high-level workflow diagram for generating and using a decision tree from a neural network, in accordance with embodiments of the present disclosure.

Referring now to FIG. 1, illustrated is a high-level workflow diagram 100 for generating and using a decision tree 110 from a neural network 105, in accordance with embodiments of the present disclosure. Neural network 105 may be any suitable neural network configuration, without limitation. Greater detail regarding an example neural network is given with regards to FIG. 2.

Neural network architecture search (NAS) techniques may be employed to generate decision tree 110. NAS may be used to design artificial neural networks and optimize their parameters and sub-unit configurations. In some embodiments of the present disclosure, NAS is modified to determine the architecture and parameters of a pre-existing neural network (e.g., parameterize the features of the neural network). This information may then be used to generate a decision tree (e.g., decision tree 110), or other interpretable data structure, which can be presented to a user and correspond to the neural network of interest (e.g., neural network 105).

In some embodiments, the NAS conversion may further include long short-term memory (LSTM) techniques for parameterizing additional features of sub-units of a neural network. LSTM may be used as a recurrent neural network architecture and can process single data points (e.g., an image) as well as strings of data (e.g., video data, audio data, slide shows, sequences of algorithms, etc.). LSTM cells/nodes are capable of retaining/"remembering" values, and therefore can be modified to monitor and identify how data is processed and/or changed as it passes through an LSTM-modeled neural network (e.g., the parameters of the sub-units/nodes of the neural network may be described).

A user may use the decision tree 110 to more easily read and/or understand the inner workings and content of the neural network 105, as well as make modifications and/or adjustments. For example, the user may add or delete nodes of the decision tree 110, change node dependencies, adjust information contained within a particular node, or any other suitable modification or adjustment.

In some embodiments, the adjustments/modifications may be incorporated back into the neural network 105 concurrently using NAS techniques in reverse. In some embodiments, the adjustments may result in an adjusted decision tree 115, which the user may review and further edit. Reverse NAS techniques may then be used to generate an adjusted neural network (not shown) or to modify the neural network 105 to reflect the user's modifications/adjustments.

Figure 2:
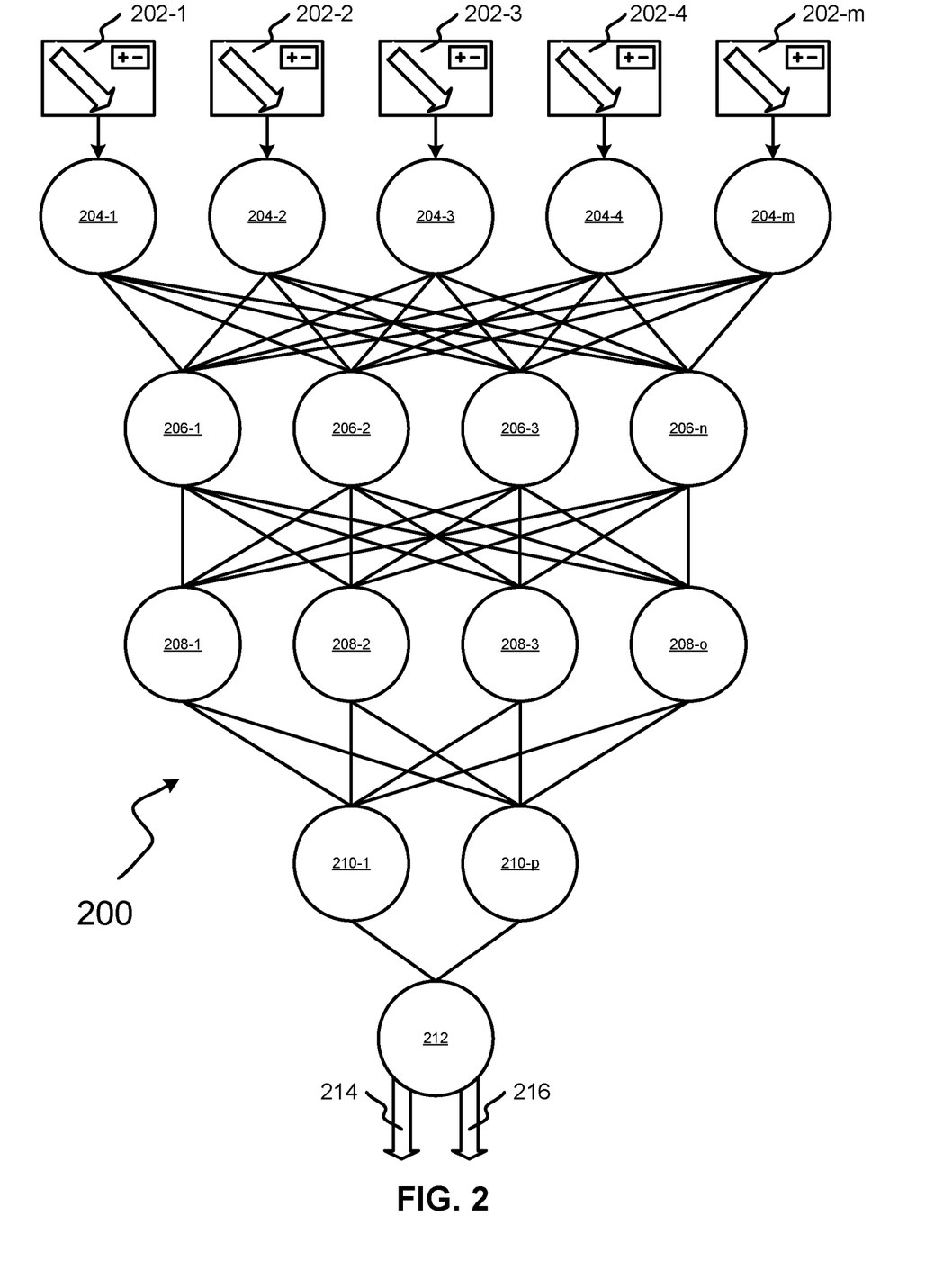
FIG. 2 illustrates an example neural network that may be used to generate a decision tree and/or to incorporate adjustments to the decision tree, in accordance with embodiments of the present disclosure.

FIG. 2 depicts an example neural network 200 that may be used to generate a decision tree or other suitable data structure, such as a DAG, in accordance with embodiments of the present disclosure. The example neural network 200 may further be communicably linked to the decision tree, and further be modified/adjusted in response to user modifications made to the decision tree. In embodiments, parallel techniques (e.g., Single Instruction Multiple Data (SIMD) techniques) may be employed to concurrently apply adjustments to both the decision tree and the example neural network 200 as the adjustments are received (e.g., "on the fly") In embodiments, neural network 200 may be a classifier-type neural network. Neural network 200 may be part of a larger neural network (e.g., may be a sub-unit of a larger neural network). For example, neural network 200 may be nested within a single, larger neural network, connected to several other neural networks, or connected to several other neural networks as part of an overall aggregate neural network.

Inputs 202-1 through 202-$m$ represent the inputs to neural network 200. In this embodiment, 202-1 through 202-$m$ do not represent different inputs. Rather, 202-1 through 202-$m$ represent the same input that is sent to each first-layer neuron (neurons 204-1 through 204-$m$) in neural network 200. In some embodiments, the number of inputs 202-1 through 202-$m$ (i.e., the number represented by m) may equal (and thus be determined by) the number of first-layer neurons in the network. In other embodiments, neural network 200 may incorporate 1 or more bias neurons in the first layer, in which case the number of inputs 202-1 through 202-$m$ may equal the number of first-layer neurons in the network minus the number of first-layer bias neurons. In some embodiments, a single input (e.g., input 202-1) may be input into the neural network. In such an embodiment, the first layer of the neural network may comprise a single neuron, which may propagate the input to the second layer of neurons.

Inputs 202-1 through 202-$m$ may comprise one or more samples of classifiable data. For example, inputs 202-1 through 202-$m$ may comprise 10 samples of classifiable data. In other embodiments, not all samples of classifiable data may be input into neural network 200.

Neural network 200 may comprise 5 layers of neurons (referred to as layers 204, 206, 208, 210, and 212, respectively corresponding to illustrated nodes 204-1 to 204-$m$, nodes 206-1 to 206-$n$, nodes 208-1 to 208-$o$, nodes 210-1 to 210-$p$, and node 212). In some embodiments, neural network 200 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 212 is treated as the output layer. Layer 212 outputs a probability that a target event will occur and contains only one neuron (neuron 212). In other embodiments, layer 212 may contain more than 1 neuron. In this illustration no bias neurons are shown in neural network 200. However, in some embodiments each layer in neural network 200 may contain one or more bias neurons.

Layers 204-212 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the activation function. For example, layer 204 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 206, for example, may be a dense layer. In this example, the dense layer may process and reduce the dimensions of the feature vector (e.g., the vector portion of inputs 202-1 through 202-$m$) to eliminate data that is not contributing to the prediction. As a further example, layer 208 may be a "batch normalization" layer. Batch normalization may be used to normalize the outputs of the batch-normalization layer to accelerate learning in the neural network. Layer 210 may be any of a dropout, hidden, or batch-normalization layer. Note that these layers are examples. In other embodiments, any of layers 204 through 210 may be any of dropout, hidden, or batch-normalization layers. This is also true in embodiments with more layers than are illustrated here, or fewer layers.

Layer 212 is the output layer. In this embodiment, neuron 212 produces outputs 214 and 216. Outputs 214 and 216 represent complementary probabilities that a target event will or will not occur. For example, output 214 may represent the probability that a target event will occur, and output 216 may represent the probability that a target event will not occur. In some embodiments, outputs 214 and 216 may each be between 0.0 and 1.0, and may add up to 1.0. In such embodiments, a probability of 1.0 may represent a projected absolute certainty (e.g., if output 214 were 1.0, the projected chance that the target event would occur would be 100%, whereas if output 216 were 1.0, the projected chance that the target event would not occur would be 100%).

In embodiments, FIG. 2 illustrates an example probability-generator neural network with one pattern-recognizer pathway (e.g., a pathway of neurons that processes one set of inputs and analyzes those inputs based on recognized patterns, and produces one set of outputs). However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant.

In embodiments, neural network 200 may be trained/adjusted (e.g., biases and weights among nodes may be calibrated) by inputting feedback and/or input from a user (e.g., via the decision tree/DAG) to correct/force the neural network to arrive at an expected output. In some embodiments, the feedback may be forced selectively to particular nodes and/or sub-units of the neural network, via the decision tree/DAG. In some embodiments, the impact of the feedback on the weights and biases may lessen over time, in order to correct for inconsistencies among user(s) and/or datasets. In embodiments, the degradation of the impact may be implemented using a half-life (e.g., the impact degrades by 50% for every time interval of X that has passed) or similar model (e.g., a quarter-life, three-quarter-life, etc.).

Figure 3:
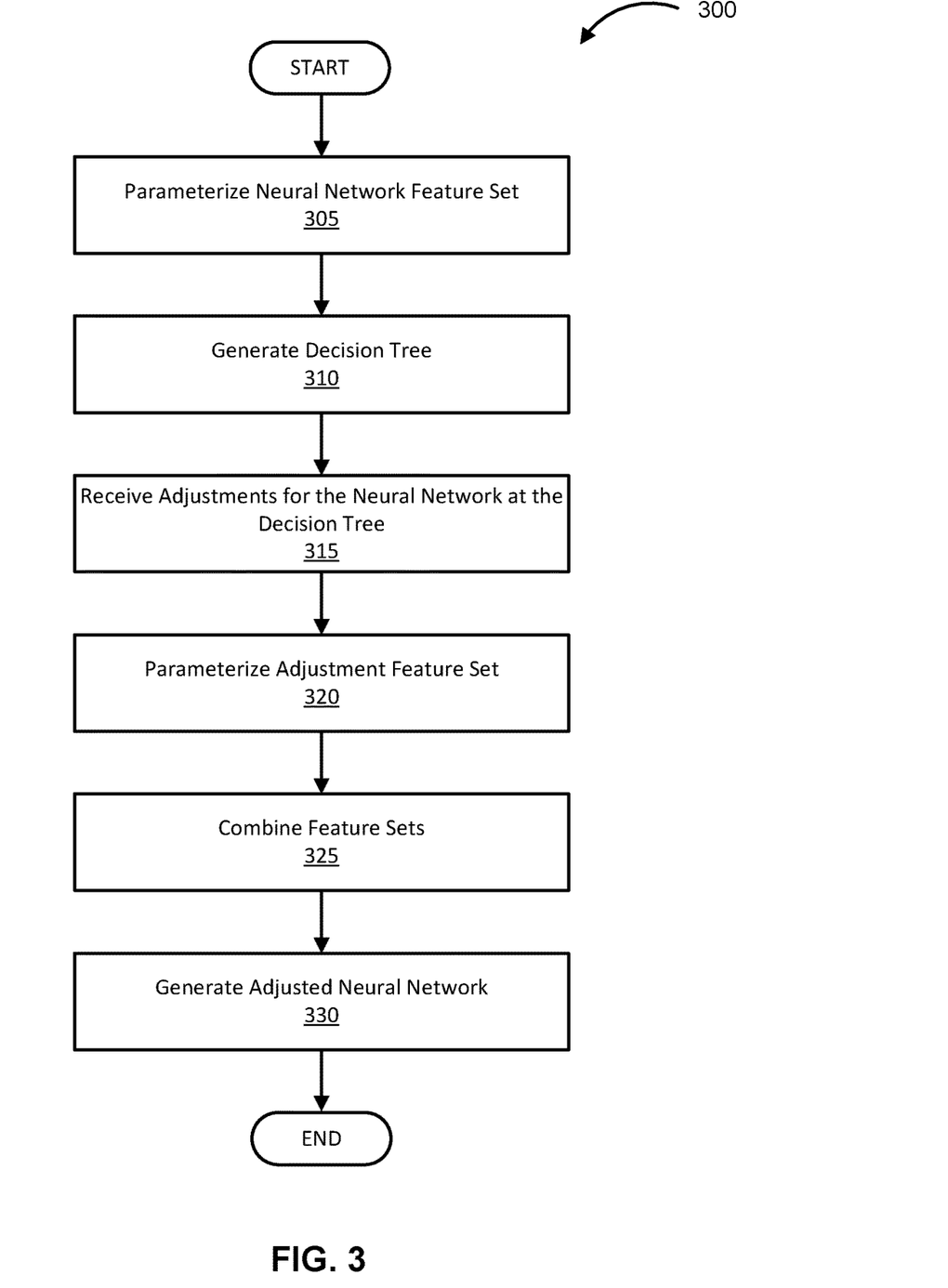
FIG. 3 illustrates a flowchart of a method for generating and using a decision tree from a neural network, in accordance with embodiments of the present disclosure.

Referring now to FIG. 3, described is a flowchart for a method 300 for generating and using a decision tree from a neural network, in accordance with embodiments of the present disclosure. Method 300 may begin at 305, where a feature set for a neural network is parameterized. As described herein, NAS and LSTM techniques may be used to identify and determine the features of the neural network and its sub-units. Features may include, but are not limited to, the number of layers, the number and type of nodes, the functions and algorithms performed by each node, the timing of the nodes, the weights and/or biases employed, etc.

At 310, the parameterized feature set is used to generate a decision tree, where the nodes and structure of the decision tree correspond to the nodes and structure of the neural network. In some embodiments, the decision tree may be implemented as an interactive interface with which users may adjust the nodes, edges, values, and other features of the decision tree. For example, the decision tree can be displayed on a display device (e.g. Liquid Crystal Display, Plasma display, etc.) and adjustments can be received via a user input device (e.g. touchscreen interface, mouse, pointer device, etc.)

Users may adjust the contents of a node, change the node type, alter the splitting of the decision tree, adjust node relationships (e.g., shift edges to connect a different pair of nodes), adjust weights and or biases, etc. These adjustments are received at 315. In some embodiments, the adjustments may be processed as they are received (e.g., "on-the-fly"), and in other embodiments, the adjustments may be aggregated/collected and processed as a batch once all user modifications/adjustments have been received.

At 320, the adjustment feature set is parameterized. In other words, the modifications/adjustments to the decision tree are parameterized such that the adjustments may be incorporated back into the original neural network, or in a second, updated version. In some embodiments, the feature set parameterized at 320 may include the nodes of the decision tree, splitting conditions, tree depth, tree hierarchy, timing information, etc.

At 325, the neural network feature set and the adjusted feature set are combined and otherwise prepared to serve as a blueprint for adjusting the neural network and/or building a new, updated neural network based on the adjusted decision tree.

At 330, the adjusted neural network is generated using reverse NAS techniques, as described herein. In some embodiments, this may include LSTM techniques, where appropriate, as described herein.

Figure 4:
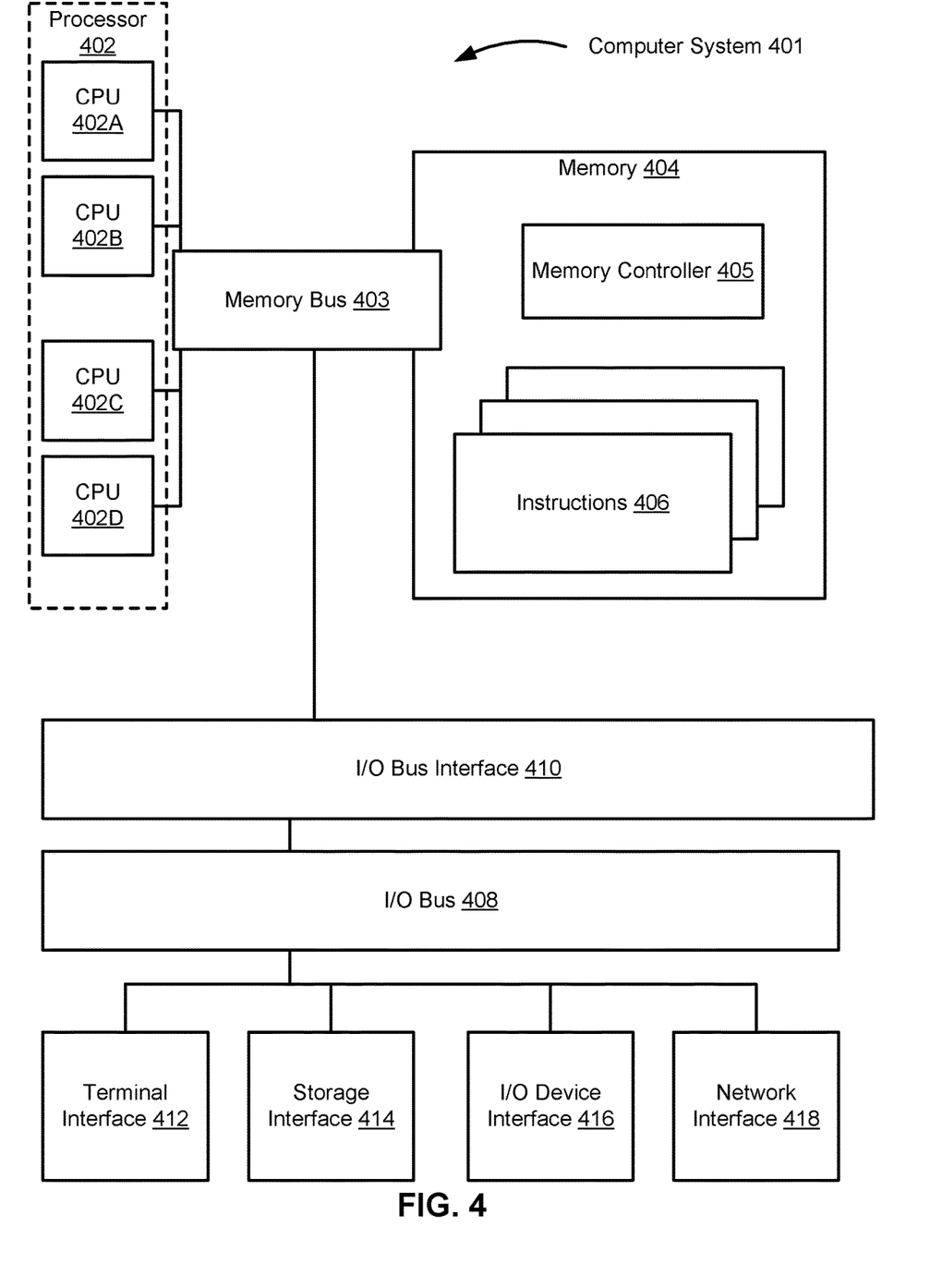
FIG. 4 depicts a high-level block diagram of an example computer system that may be used in implementing embodiments of the present disclosure.

Referring now to FIG. 4, shown is a high-level block diagram of an example computer system 401 that may be configured to perform various aspects of the present disclosure, including, for example, method 300, described in FIG. 4. The example computer system 401 may be used in implementing one or more of the methods or modules, and any related functions or operations, described herein (e.g., using one or more processor circuits or computer processors of the computer), in accordance with embodiments of the present disclosure. In some embodiments, the illustrative components of the computer system 401 comprise one or more CPUs 402, a memory subsystem 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may comprise one or more levels of on-board cache. Memory subsystem 404 may include instructions 406 which, when executed by processor 402, cause processor 402 to perform some or all of the functionality described above with respect to FIGS. 1-3.

In some embodiments, the memory subsystem 404 may comprise a random-access semiconductor memory, storage device, or storage medium (either volatile or non-volatile) for storing data and programs. In some embodiments, the memory subsystem 404 may represent the entire virtual memory of the computer system 401 and may also include the virtual memory of other computer systems coupled to the computer system 401 or connected via a network. The memory subsystem 404 may be conceptually a single monolithic entity, but, in some embodiments, the memory subsystem 404 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 404 may contain elements for control and flow of memory used by the CPU 402. This may include a memory controller 405.

Although the memory bus 403 is shown in FIG. 4 as a single bus structure providing a direct communication path among the CPUs 402, the memory subsystem 404, and the I/O bus interface 410, the memory bus 403 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, mobile device, or any other appropriate type of electronic device.

It is noted that FIG. 4 is intended to depict the representative example components of an exemplary computer system 401. In some embodiments, however, individual components may have greater or lesser complexity than as represented in FIG. 4, components other than or in addition to those shown in FIG. 4 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating and using an interactive decision tree from a neural network, the method comprising:
    parameterizing a first set of features associated with a neural network;
    generating, from the first set of features, a decision tree;
    displaying the decision tree as an interactive interface that enables manual adjustments to the decision tree, the manual adjustments including adjusting a number of layers in the decision tree, and adjusting a number of nodes in the decision tree;
    receiving, through user interaction with the displayed decision tree, one or more manual adjustments to the decision tree;
    parameterizing a second set of features associated with the one or more manual adjustments to the decision tree;
    combining the parameterized first and second set of features into a plurality of parameters; and
    generating, from the plurality of parameters, an adjusted neural network.

2. The method of claim 1, wherein the first set of features includes at least a number of layers of the neural network, a number of neurons in each layer of the neural network, a neuron type for each neuron of the neural network, a weight for each edge of the neural network, and a bias for each edge of the neural network.

3. The method of claim 1, wherein the second set of features includes at least a node type for each node in the decision tree, a depth of the decision tree, and a dataset within each node of the decision tree.

4. The method of claim 1, wherein the one or more manual adjustments includes adjusting a weight and a bias of at least one edge of the neural network.

5. The method of claim 1, wherein the decision tree is generated using network architecture search techniques.

6. The method of claim 5, wherein the adjusted neural network is generated using network architecture search techniques in a reverse process to apply the plurality of parameters to the adjusted neural network.

7. The method of claim 6, wherein the neural network is communicably linked to the decision tree, and wherein parallel techniques are employed to concurrently generate the adjusted neural network as the one or more manual adjustments are received.

8. The method of claim 1, wherein the interactive interface further enables manual adjustments including adjusting a type of at least one of the nodes, and adjusting a timing of an operation at least one of the nodes.

9. The method of claim 1, wherein the interactive interface further enables manual adjustments including adjusting functions and/or algorithms for at least one of the nodes, adjusting contents for at least one of the nodes, and shifting at least one edge to connect to a different pair of nodes.

10. A computer program product for generating and using an interactive decision tree from a neural network, the computer program product comprising a computer readable storage medium having program instructions embodied therewith, the program instructions executable by a device to cause the device to:
    parameterize a first set of features associated with a neural network;
    generate, from the first set of features, a decision tree;
    display the decision tree as an interactive interface that enables manual adjustments to the decision tree, the manual adjustments including adjusting a number of layers in the decision tree, and adjusting a number of nodes in the decision tree;
    receive, through user interaction with the displayed decision tree, one or more manual adjustments to the decision tree;
    parameterize a second set of features associated with the one or more manual adjustments to the decision tree;
    combine the parameterized first and second set of features into a plurality of parameters; and
    generate, from the plurality of parameters, an adjusted neural network.

11. The computer program product of claim 10, wherein the first set of features includes at least a number of layers of the neural network, a number of neurons in each layer of the neural network, a neuron type for each neuron of the neural network, a weight for each edge of the neural network, and a bias for each edge of the neural network.

12. The computer program product of claim 10, wherein the second set of features includes at least a node type for each node in the decision tree, a depth of the decision tree, and a dataset within each node of the decision tree.

13. The computer program product of claim 10, wherein the decision tree is generated using network architecture search techniques.

14. The computer program product of claim 13, wherein the adjusted neural network is generated using reverse network architecture search techniques.

15. The computer program product of claim 14, wherein the neural network is communicably linked to the decision tree, and wherein parallel techniques are employed to concurrently generate the adjusted neural network as the one or more manual adjustments are received.

16. A system for generating and using an interactive decision tree from a neural network, comprising:
    a memory with program instructions included thereon; and
    a processor in communication with the memory, wherein the program instructions cause the processor to:

parameterize a first set of features associated with a neural network;

generate, from the first set of features, a decision tree;

display the decision tree as an interactive interface that enables manual adjustments to the decision tree, the manual adjustments including adjusting a number of layers in the decision tree, and adjusting a number of nodes in the decision tree;

receive, through user interaction with the displayed decision tree, one or more manual adjustments to the decision tree;

parameterize a second set of features associated with the one or more manual adjustments to the decision tree;

combine the parameterized first and second set of features into a plurality of parameters; and generate, from the plurality of parameters, an adjusted neural network.

17. The system of claim 16, wherein the first set of features includes at least a number of layers of the neural network, a number of neurons in each layer of the neural network, a neuron type for each neuron of the neural network, a weight for each edge of the neural network, and a bias for each edge of the neural network.

18. The system of claim 16, wherein the decision tree is generated using network architecture search techniques.

19. The system of claim 18, wherein the adjusted neural network is generated using reverse network architecture search techniques.

20. The system of claim 19, wherein the neural network is communicably linked to the decision tree, and wherein parallel techniques are employed to concurrently generate the adjusted neural network as the one or more manual adjustments are received.

* * * * *